(12) United States Patent
Driver et al.

(10) Patent No.: US 7,360,559 B2
(45) Date of Patent: *Apr. 22, 2008

(54) STEAM CURE OF CURED IN PLACE LINER

(75) Inventors: Franklin Thomas Driver, St. Charles, MO (US); Weiping Wang, Ballwin, MO (US)

(73) Assignee: Insituform (Netherlands) B.V., Rotterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/522,652

(22) Filed: Sep. 18, 2006

(65) Prior Publication Data

US 2007/0031194 A1 Feb. 8, 2007

Related U.S. Application Data

(60) Continuation of application No. 11/268,388, filed on Nov. 7, 2005, now Pat. No. 7,108,456, which is a continuation of application No. 10/760,513, filed on Jan. 20, 2004, now Pat. No. 6,969,216, which is a division of application No. 10/404,183, filed on Apr. 1, 2003, now Pat. No. 6,679,293, which is a continuation of application No. 10/098,974, filed on Mar. 14, 2002, now Pat. No. 6,539,979, which is a continuation of application No. 09/927,189, filed on Aug. 10, 2001, now abandoned.

(51) Int. Cl.
*F16L 55/16* (2006.01)

(52) U.S. Cl. .................. 138/98; 138/97; 405/184.2; 405/184.1; 156/287

(58) Field of Classification Search ............... 138/98, 138/97; 156/287, 294; 405/184.1, 184.2, 405/150.1

See application file for complete search history.

(56) References Cited

U.S. PATENT DOCUMENTS

| 4,064,211 A | * | 12/1977 | Wood ..................... 264/516 |
| 4,334,943 A | * | 6/1982 | Zenbayashi et al. ........ 156/287 |
| 4,350,548 A | | 9/1982 | Zenbayashi et al. |
| 4,368,091 A | * | 1/1983 | Ontsuga et al. ............. 156/287 |
| 5,154,936 A | * | 10/1992 | Driver et al. ............... 425/182 |
| 5,368,809 A | * | 11/1994 | Steketee, Jr. ............... 264/516 |
| 5,374,174 A | * | 12/1994 | Long, Jr. ..................... 425/11 |
| 5,397,513 A | * | 3/1995 | Steketee, Jr. ............. 264/36.17 |
| 5,736,166 A | | 4/1998 | Polivka |
| 6,270,289 B1 | | 8/2001 | Einhaus et al. |
| 6,390,795 B1 | | 5/2002 | Waring et al. |
| 6,708,728 B2 | | 3/2004 | Driver et al. |
| 6,960,313 B2 | | 11/2005 | Waring et al. |

* cited by examiner

*Primary Examiner*—Patrick F. Brinson
(74) *Attorney, Agent, or Firm*—Greenberg Traurig, LLP; Michael I. Wolfson

(57) ABSTRACT

A process for lining an existing pipeline or conduit with a flexible resin impregnated cured in place liner by pulling in the liner and inflating an eversion bladder with air and curing the liner with flow-through steam without loss of pressure is provided. The bladder is stored in a pressure bladder canister coupled to a pressurized downtube and eversion elbow. The bladder is everted by introducing pressurized air into the canister As the bladder reaches the distal manhole, it enters a receiving canister where it is punctured while maintaining air pressure within the bladder a pinch valve between the downtube and elbow isolates the inverted bladder so that steam can be introduced into the bladder to cure the resin and exhaust through the receiving canister. The bladder is then removed and lateral service reinstated.

14 Claims, 9 Drawing Sheets

STEAM CURE OF CURED IN PLACE LINER

CROSS-REFERENCE TO RELATED APPLICATIONS

This application is a continuation of application Ser. No. 11/268,388 filed on Nov. 7, 2005, now U.S. Pat. No. 7,108,456 issued on Sep. 19, 2006, which is a continuation of application Ser. No. 10/760,513, now U.S. Pat. No. 6,969,216, issued on Nov. 29, 2005, filed on Jan. 20, 2004, which is a divisional of application Ser. No. 10/404,183, filed on Apr. 1, 2003, now U.S. Pat. No. 6,679,293, which is a continuation of application Ser. No. 10/098,974 filed on Mar. 14, 2002, now U.S. Pat. No. 6,539,979 issued on Apr. 1, 2003, which is a continuation of application Ser. No. 09/927,189, filed Aug. 10, 2001, now abandoned.

BACKGROUND OF THE INVENTION

This invention relates to a method for installation of a cured in place liner by pulling in and inflating the liner and more particularly to a method of trenchless rehabilitation of an existing conduit by pulling a resin impregnated liner into the existing conduit everting an inflation bladder stored in a pressurized bladder canister into the liner by introducing air into the canister, isolating the canister and introducing continuous flow-through steam into the bladder without loss of pressure in the bladder and to the apparatuses for practicing the method.

It is generally well known that conduits or pipelines, particularly underground pipes, such as sanitary sewer pipes, storm sewer pipes, water lines and gas lines that are employed for conducting fluids frequently require repair due to fluid leakage. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakages are undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. This Process is described in U.S. Pat. Nos. 4,009,063, 4,064,211 and 4,135,958, the contents of all of which are incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. Generally, the liner is installed utilizing an eversion process, as described in the later two identified Insituform patents. In the eversion process, radial pressure applied to the interior of an everted liner presses it against and into engagement with the inner surface of the pipeline. However, the Insituform Process is also practiced by pulling a resin impregnated liner into the conduit by a rope or cable and using a separate fluid impermeable inflation bladder or tube that is everted within the liner to cause the liner to cure against the inner wall of the existing pipeline. Such resin impregnated liners are generally referred to as "cured-in-place-pipes"or "CIPP liners" and the installation is referred to a CIPP installation.

The CIPP flexible tubular liners have an outer smooth layer of relatively flexible, substantially impermeable polymer coating the outside of the liner in its initial state. When everted, this impermeable layer ends up on the inside of the liner after the liner is everted during installation. As the flexible liner is installed in place within the pipeline, the pipeline is pressurized from within, preferably utilizing an eversion fluid, such as water or air to force the liner radially outwardly to engage and conform to the interior surface of the existing pipeline. Cure is initiated by introduction of hot water into the everted liner through a recirculation hose attached to the end of the everting liner. The resin impregnated into the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

When tubular cured in place liners are installed by the pull in and inflate method, the liner is impregnated with resin in the same manner as the eversion process and positioned within the existing pipeline in a collapsed state. A downtube, inflation pipe or conduit having an elbow at the lower end typically is positioned within an existing manhole or access point and an everting bladder is passed through the downtube, opened up and cuffed back over the mouth of the horizontal portion of the elbow. The collapsed liner within the existing conduit is then positioned over and secured to the cuffed back end of the inflation bladder. An everting fluid, such as water, is then fed into the downtube and the water pressure causes the inflation bladder to push out of the horizontal portion of the elbow and cause the collapsed liner to expand against the interior surface of the existing conduit. The eversion of the inflation bladder continues until the bladder reaches and extends into the down stream manhole or second access point. At this time the liner pressed against the interior surface of the existing conduit is allow to cure. Cure is initiated by introduction of hot water into the inflation bladder which is circulated to cause the resin in the impregnated liner to cure.

After the resin in the liner cures, the inflation bladder may be removed or left in place in the cured liner. If the inflation bladder is to be left in place, the bladder will generally be one that has a relatively thin resin impregnable layer on the inside of the impermeable outer layer. In this case, the impregnable layer after eversion will cause the bladder to adhere to the resin impregnated layer of the liner as is well known in the art. At this time, entry into the manhole or access point is required to open the liner to release the water used to inflate the bladder and to cut off the ends extending into the manholes. When the inflation bladder is to be removed, it may be removed by pulling at the evasion end on a holdback rope attached to the trailing end of the inflation bladder used to control the speed of the eversion. This is generally done after puncturing the bladder at the receiving end to release the water used to evert the bladder and initiate the resin cure. Finally, the downtube can then be removed and service can be reconnected through the lined pipeline. If intersecting service connections are present, they would be reopened prior to resumption of service through the lined pipeline.

When a cured in place liner is installed using the pull in and inflate method, the outer impermeable layer of the liner remains pressed against the interior surface of the existing conduit. Certain advantages may be attained by this method of installation because the resin in the resin impregnable layer of the liner is trapped between two impermeable layers, namely the outer coating of the liner and the inflation bladder on the inside. Accordingly, there is little or no resin migration out of the resin impregnable layer of the liner. In a pull in and inflate installation, the liner coating need not be as strong as required in an installation by eversion, because the coating is not subjected to the pressure head required to evert the liner using the eversion process. Additionally, the coating does not come into contact with hot fluid circulating during the resin cure cycle. Thus, the liner may be of more uniform thickness in a pull in and inflate using an inflation bladder cured in place process compared to when the liner itself is everted.

While the pull in and inflate method has these advantages, the installation process is somewhat more complex than an eversion of the resin impregnated liner. Conventional pull in and inflate methods requires banding the inflation bladder to the downtube elbow and securing the collapsed liner already positioned in the existing pipeline to the downtube. This requires work within a restricted manhole space. Additionally, at the end of the installation, the inflation bladder may need to be removed after being cut at the distal end to release the water used as the inflation fluid.

While the pull in and inflate method utilizing water does have the various advantages noted above, the shortcomings tend to increase labor costs which are a significant aspect of the installation process. Accordingly, it is desirable to provide a rehabilitation method using pull in and inflate, wherein the liner is inflated with an eversion fluid, such as air, and the resin is cured by steam a heated curing fluid, such as flows through the inflated bladder, to take advantage of the energy available in the heated fluid to provide an installation method which is faster and more efficient economically than various rehabilitation methods currently practiced.

SUMMARY OF THE INVENTION

Generally speaking, in accordance with the invention, a method of rehabilitation of an existing pipeline by pull in and inflate installation of cured in place liners using air to inflate an inflation bladder and curing with flow-through steam without loss of pressure in the liner is provided. A resin impregnated liner is pulled into the existing pipeline to be repaired and cut to extend beyond the ends of the pipeline. An inflation bladder stored in a pressurized bladder canister is attached to an inflation elbow that is placed in the upstream or eversion manhole and the collapsed liner is secured to the outlet end of the bladder on the elbow. Pressurized air is introduced into the bladder canister to evert the bladder. When the bladder approaches the downstream access point, eversion is stopped and the liner is attached to a receiving canister in the downstream or receiving manhole. The bladder is then allowed to evert further into the receiving canister, forming a seal and is punctured. Air pressure is maintained in the bladder and exits the receiving canister through an exhaust line attached to the distal end of the canister.

While maintaining pressure in the bladder canister and bladder, a pinch valve at the inlet side of the eversion elbow is closed. Steam is introduced into the elbow downstream of the valve and passes through the bladder to initiate the cure and exits through the canister exhaust. After the resin in the liner is cured, the steam is turned off and the air pressure is adjusted to maintain pressure in the bladder and maximize cooling. The valve is opened and the inflation bladder is then withdrawn by de-everting. Any condensate in the bladder is removed through a condensate trap in the elbow in the eversion manhole.

In a preferred embodiment of the invention, an easement vehicle carries a pressure bladder canister with a spooled inflation bladder of appropriate length on a staging spool mounted there in. The vehicle is positioned at the eversion access and includes valves and regulators for applying pressurized air to the canister for eversion of the bladder and steam for curing of the liner and removal of the bladder after cure. In a most preferred aspect of the invention, the inflation fluid is air which is introduced into the bladder canister for inflating the bladder. This allows the precise control of the speed of the everting bladder. After the bladder inflates the liner, it enters a receiving canister having a puncturing element positioned in the receiving manhole. The bladder is sealed against the canister wall and is punctured to allow air to exit through an exhaust port. The elbow valve is sealed about the bladder and steam is introduced at the eversion elbow. The steam flows through the bladder to cure the resin quickly and completely without loss of pressure in the bladder. This maintains hot curing fluids safely below ground, a safe distance away from any personnel.

Accordingly, it is the object of the invention to provide an improved method for rehabilitation of an existing pipeline by the installation of a cured in place liner by the pull in and inflate method utilizing an inflation bladder stored in a pressurized bladder canister.

Another object of the invention is to provide an improved method for pull in and inflate installation of a cured in place liner by introducing a pressurized eversion fluid into the a bladder canister to control eversion of the bladder.

A further object of the invention is to provide an improved method of installation of a cured in place liner by pull in and inflate wherein the bladder canister is isolated by a pinch valve and a pressurized curing fluid is introduced into the bladder to cure the resin.

Yet another object of the invention is to provide an improved method for pull in and inflate installation of a cured in place liner by introducing pressurized air as a eversion fluid into the a bladder canister to control eversion of the bladder.

It is a further object of the invention is to provide an improved method of installation of a cured in place liner by pull in and inflate wherein the bladder canister is isolated from the bladder canister by a pinch valve and steam as a curing fluid is introduced into the bladder to cure the resin.

Still another object of the invention is to provide an improved method for pull in and inflate installation of cured in place liner by automatically puncturing the bladder as it enters a receiving canister in the downstream manhole.

Still another object of the invention is to provide a bladder canister, pressurized downtube, pinch valve and elbow assembly to provide for steam flowing through the everted inflation bladder.

Still another object of the invention is to provide an improved easement unit for use in the installation of cured in place liner by the pull in and inflate method including a pressurize bladder canister including a staging reel for holding the length of inflation bladder to be used.

Still another object of the invention is to provide a manifold to regulate air to be fed to a pressure bladder canister and eversion elbow to effect eversion of an inflation bladder and air and steam to the flow-through steam for curing.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
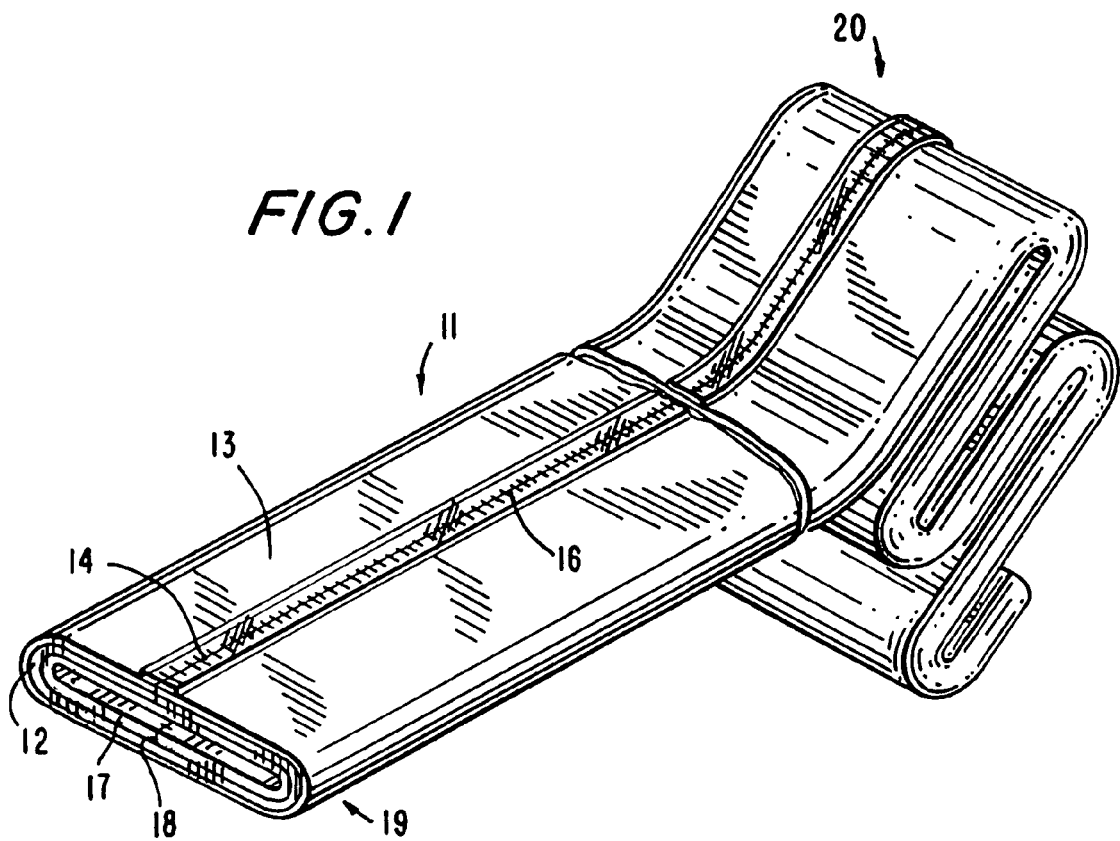
FIG. 1 is a perspective view of a length of a typical resin impregnable cured in place liner suitable for use in lining an existing pipeline in accordance with the invention.

FIG. 1 illustrates a flexible cured in place liner 11 of the type generally well known in the art. Liner 11 is formed from at least one layer of a flexible resin impregnable material, such as a felt layer 12 having an outer impermeable polymer film layer 13. Felt layer 12 and film layer 13 are stitched along a seam line 14 to form a tubular liner. A compatible thermoplastic film in a form of a tape or extruded material 16 is placed on or extruded over seam line 14 in order to ensure the impermeability of liner 11. In the embodiment illustrated in FIG. 1 and used throughout this description, liner 11 includes an inner second felt layer 17 also stitched along a seam line 18 which is positioned at a point in the tube other than the location of seam line 14 in outer felt layer 12. Liner 11 has a leading end 19 with a continuous length stored in a refrigeration unit 21 (FIG. 3) to suppress early cure of the resin. Liner 11 is cut to a desired length after being pulled into the existing pipeline.

Figure 2:
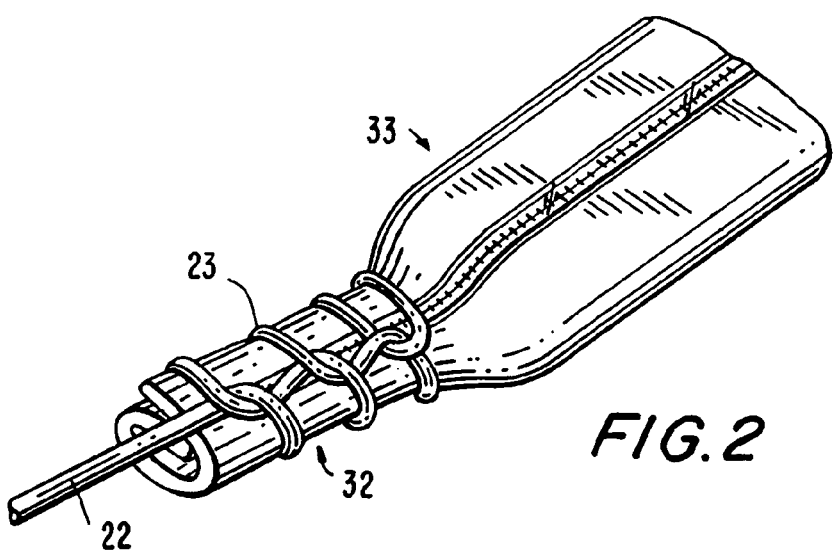
FIG. 2 is a perspective view of the liner of FIG. 1 with the leading end folded with a cable secured to it for pulling the liner into the existing pipeline.

Liner 11 of the type illustrated in FIGS. 1 and 2 is impermeable to water and air. This will allow use in an air or water eversion as described above. However, in a pull in and inflate installation in accordance with the invention, the liner need only be sufficiently impermeable to allow for suitable wet out and retention of resin and to prevent damage to the liner as it is pulled into the existing pipeline.

For larger liner diameters, several layers of felt material may be used. Felt layers 12 and 17 may be natural or synthetic flexible resin absorbable material, such as polyester or acrylic fibers. Impermeable film 13 in outer layer 12 may be a polyolefin, such as polyethylene or polypropylene, a vinyl polymer, such as polyvinyl chloride, or a polyurethane as is well known in the art. In the initial step in all trenchless rehabilitation installations, the existing pipeline is prepared by cleaning and videotaping.

Prior to commencing installation pursuant to the method in accordance with the invention, a curable thermosetting resin is impregnated into the felt of a liner 33 similar to liner 11 by a process referred to as "wet-out". The wet-out process generally involves injecting resin into felt layer or layers 12 and 17 of liner 11 through the end or an opening formed in impermeable film layer 13, drawing a vacuum and passing the impregnated liner through nip rollers as is well known in the lining art. One such procedure of this vacuum impregnation is described in Insituform U.S. Pat. No. 4,366,012, the contents of which are incorporated herein by reference. A wide variety of resins may be used, such as polyester, vinyl esters, epoxy resins and the like, which may be modified as desired. It is preferable to utilize a resin which is relatively stable at room temperature, but which cures readily when heated.

FIG. 2 shows a leading end 32 of a liner 33 with a winch rope or cable 22 secured by a slip knot and three half hitches 23 for pulling liner 33 into the pipeline. Leading end 32 of liner 33 and cable 22 may be duct taped to prevent slip of cable 22 and to seal leading end 32.

Figure 3:
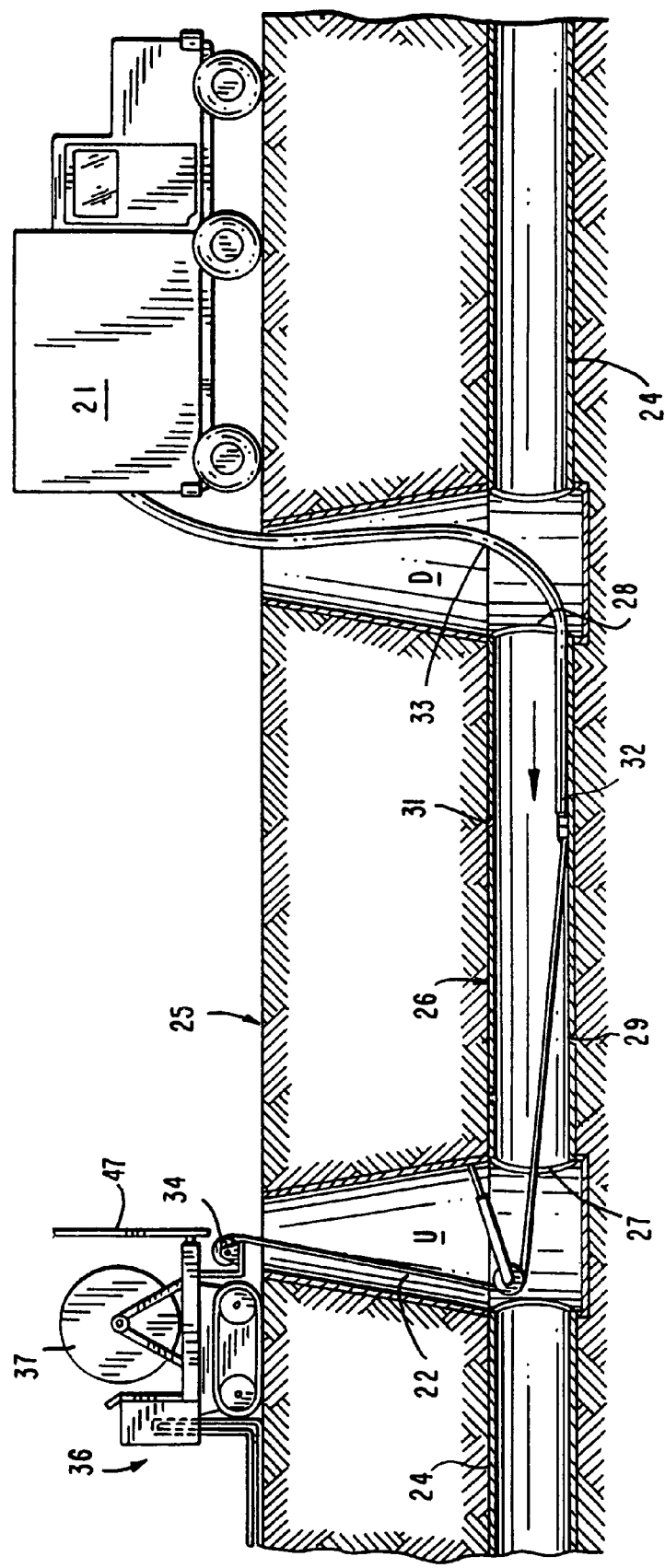
FIG. 3 is a cross-sectional elevational schematic view showing pulling in of a resin impregnated cured in place liner of the type illustrated in FIGS. 1 and 2 from a downstream or receiving manhole to an upstream or eversion manhole with an easement vehicle having a pressure bladder canister at the start of the installation process to line an underground conduit.

Referring now to FIG. 3, an existing pipeline 24 located below a surface 25 with a section 26 in need of repair between an upstream opening 27 and a downstream opening 28. Pipeline section 26 has a plurality of cracks 29 and a section of missing pipe material 31. There is first upstream or access at an upstream manhole U and a second downstream access opening at manhole D. Of course, the installation and steps to be described can be done at either end of pipeline section 26 to be repaired. For convenience, the process in accordance with the invention will be described with the eversion proceeding from upstream manhole U to downstream manhole D.

A conventional jetter is used to pull in winch cable 22 into pipeline section 26 from upstream manhole U to downstream manhole D. Cable 22 is then connected to leading end 32 of liner 33. Liner 33 is of the type shown in FIG. 1, but may have a less robust impermeable film than used in eversion installations. Liner 33 is pulled from refrigeration unit 21 positioned at downstream manhole D into pipeline section 26 to be repaired by a winch 34 positioned on an easement unit 36 on surface 25 at upstream manhole U.

Winch 34 may be a stand alone unit positioned on surface 25, or may be mounted on a vehicle, such as easement unit 36. Easement unit 36 includes additional apparatuses useful in the installation, such as a pressure bladder canister 37 including a length of an inflation bladder 38 wound on a staging reel mounted therein. Inflation bladder 38 is an impermeable flexible film in tubular form and flattened for convenient spooling and storage on a staging reel 40.

Bladder 38 may be of a thermoplastic material, such as polyethylene or polypropylene. If bladder 38 is to be left in place after curing of liner 33, the interior surface of bladder 38 will have a thin layer of impregnable material thereon. This will cause bladder 38 to adhere permanently to liner 38 after cure. Bladder 38 on reel 40 is of a length a safe margin longer than the length of pipeline section 26 to be repaired. Typically, an excess of about 2 to 15 percent of bladder length is placed on staging reel 40 is provided, and preferably about 5 to 10 percent in excess.

Figure 4:
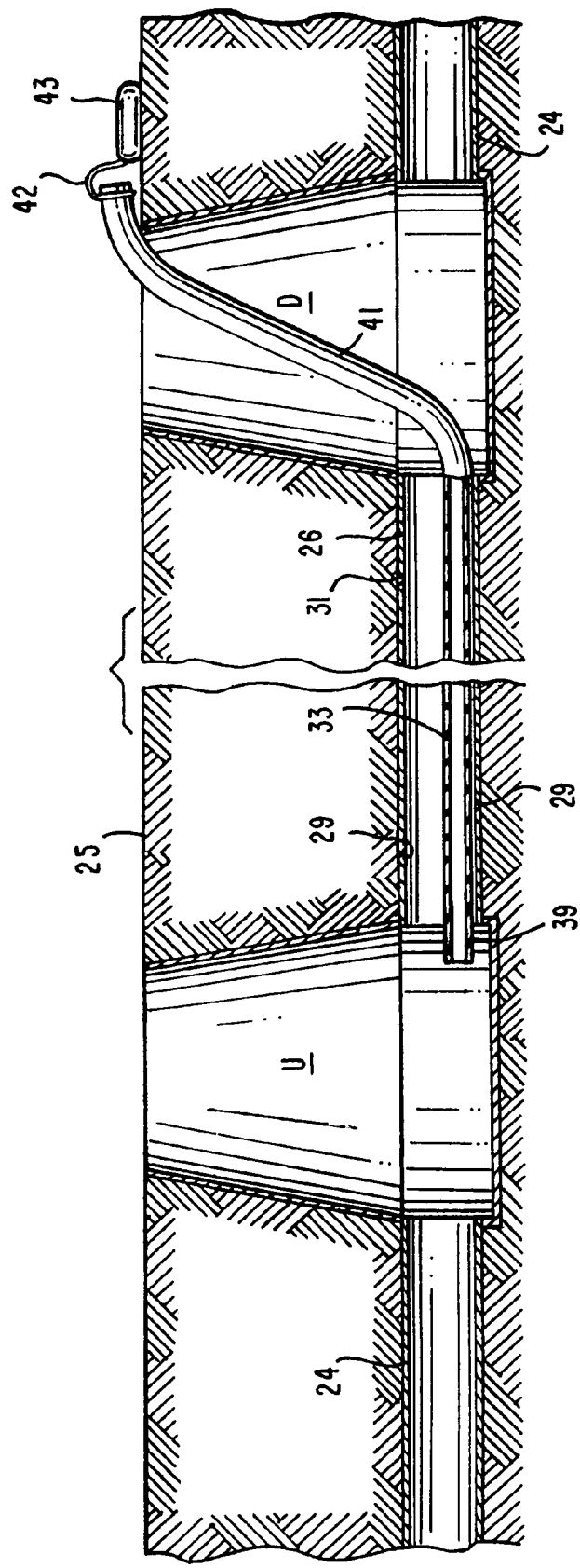
FIG. 4 is a cross-sectional elevational schematic view of the collapsed cured in place liner of FIG. 3 after it is positioned within the existing conduit at the start of the installation in accordance with the invention.

Referring now to FIG. 4, installation of resin impregnated liner 33 using an improved pull in and inflate method in accordance with the invention is illustrated. Resin impregnated liner 33 is pulled into the pipeline section 26 to be relined with about a foot of liner 39 extending into upstream manhole U. A length of excess of liner 41 of about eight to ten feet remains in downstream manhole D. Excess 41 may be held on surface 25 by a piece of tape or rope 42 secured to a sandbag 43. Excess liner 41 is provided to accommodate movement of liner 33 as it is expanded.

In the conventional pull in and inflate installation process utilizing a water eversion process, pressure within the bladder and liner is maintained due to the height of the water column within the downtube. Cure is initiated by exposing the impregnated liner to heat. This is usually accomplished by introducing heated water into the eversion pipe or by circulating hot water through a recirculation hose pulled into the everting bladder by a hold back rope connected to the trailing end of the everting bladder. Generally, cure takes between about 3 to 5 hours depending on the type of resin selected and the thickness of the liner. After cure, entry into the downstream manhole is necessary to release the heated water after cure prior to removal of the inflation bladder.

Figure 5:
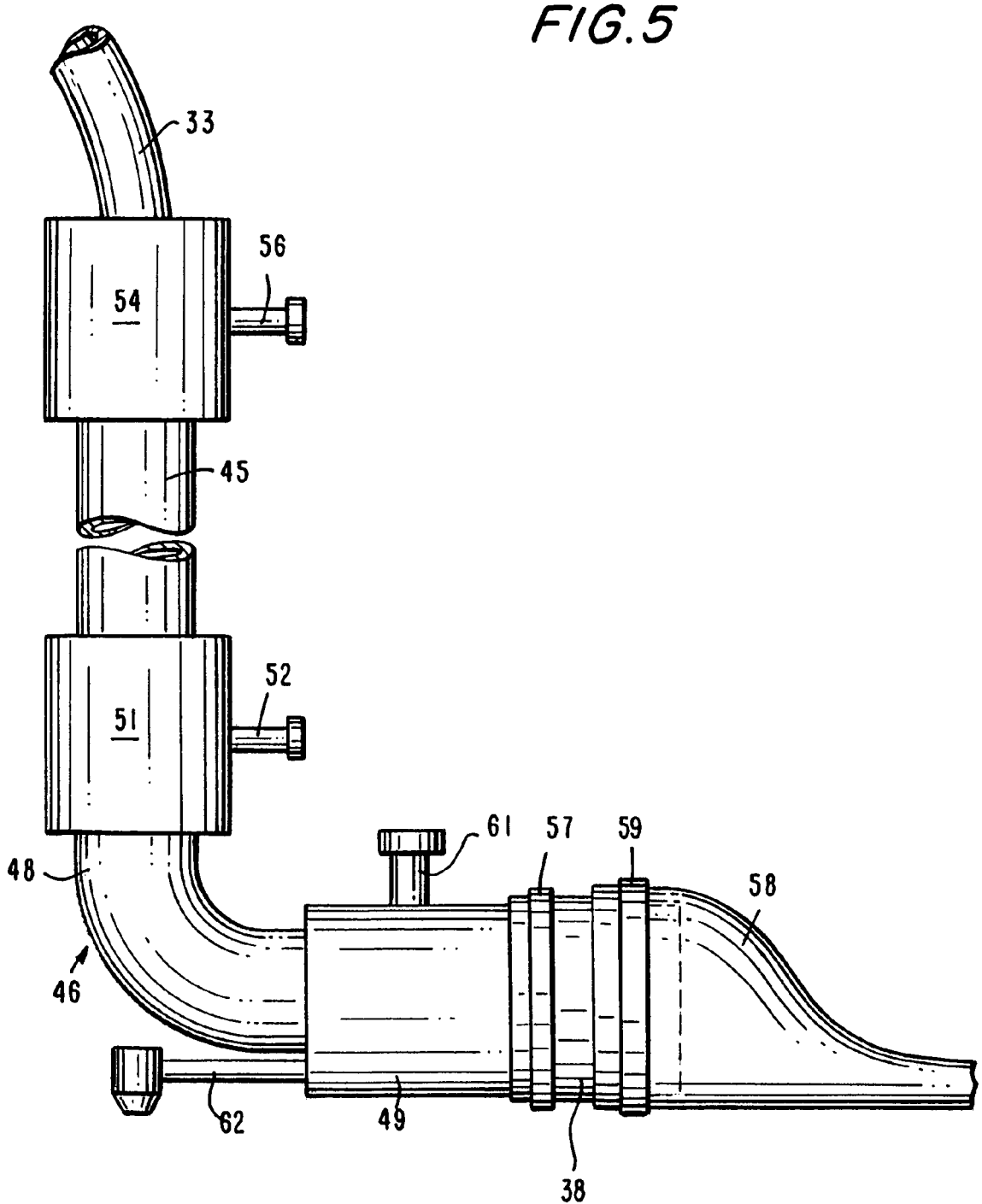
FIG. 5 is an elevational view of the eversion apparatus, including a pressurized bladder canister, a pressurized downtube, pinch valve and eversion elbow constructed and arranged in accordance with the invention with the eversion bladder and starter sleeve installed.
Figure 6:
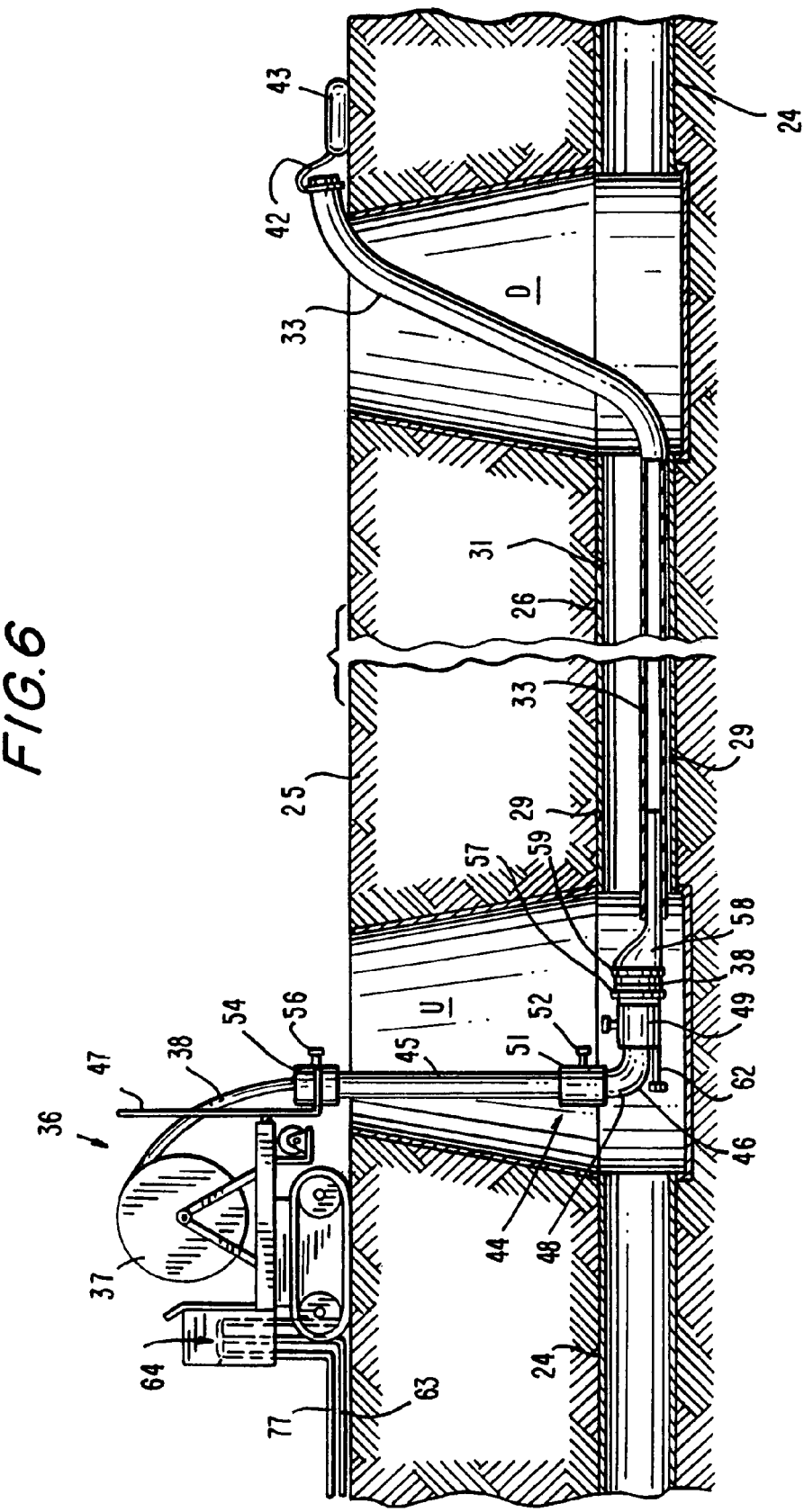
FIG. 6 is a cross-sectional elevational view showing the eversion apparatus of FIG. 5 inserted into the liner at the start of the eversion in accordance with the invention.

FIGS. 5 and 6 illustrate an eversion apparatus including pressurized bladder canister 37, a pressurized downtube 45 and an eversion elbow 46 and a pinch valve 51 at the inlet to elbow 46 to be used in accordance with a preferred embodiment of the invention. In these Figures, bladder canister 37 is shown in section mounted on easement unit 36 in accordance with a preferred embodiment of the invention. Pressurized downtube 45 is a 4" steam hose fitted with standard Chicago fittings 94 for coupling to canister 37 and valve 51. Downtube 45 is thus bendable so that simply moving easement unit 36 allows for easy adjustment depending on the depth of manhole U. Elbow 46 includes an inlet or vertical section 48 and an outlet or horizontal section 49. A pinch valve 51 has an air inlet 52 for pressurizing a flexible element therein to isolate bladder canister 37 and downtube 45 from the interior of bladder 38 when steam is introduced. Valve 51 may be a spincter valve formed from a flexible element secured within an outer cylindrical wall so that a chamber is formed behind the flexible wall to pressurize the flexible element against bladder 38. Such a value is constructed and operates similarly to the eversion apparatus described in U.S. Pat. No. 5,154,936, the contents of which are incorporated herein by reference.

Bladder canister 37 is formed from a pair of cooperating circular disk frame members 91 forming an enclosure having a bladder outlet 92 and an air inlet 93. A bladder staging spool 40 is mounted for rotation in canister 37. When closed, canister 37 is air tight can withstand more than at least 5 pounds per square inch and preferably considerably more pressure. The eversion pressure generally applied to air inlet 93 is between 3 and 10 psi, preferably about 5 psi. Outlet 92 is fitted with a Chicago or similar coupling 94 for easy and secure coupling to downtube 45 having a cooperating fitting.

Bladder canister 37 also includes bladder spool 40 mounted for rotation therein coupled to a chain 97 driven by a motor 98 as shown in FIG. 3. Chain drive 97 facilitates winding the appropriate amount of bladder 38 on spool 40 prior to the start of the installation. This can also be utilized to rewind bladder 38 after cure by de-everting it from within cured liner 33.

Inflation bladder 38 wound on staging reel 40 on easement unit 36 is fed through downtube 45, valve 51 and elbow 46. Bladder 38 is then cuffed back and banded to horizontal section 49 of elbow 46. The upper portion of downtube 45 is then coupled to bladder outlet of canister 37. Air pressure is applied to air inlet 61 and to bladder 38 sufficient to effect the eversion. Lubricant is applied to the surface of bladder 38 to facilitate movement through downtube 45 and elbow 46 during the eversion of bladder 38.

Horizontal section 49 of elbow 46 is fitted with a flexible starter sleeve 58. Starter sleeve 58 is a length of about two feet of flexible robust tubular material banded over bladder 38 with at least one banding strap 59. Starter sleeve 58 is sufficiently flexible so that when not supported it will generally lay flat. When attached to horizontal portion 49 of elbow 46, distal end of starter sleeve 58 lies flat as illustrated in FIG. 6. Eversion apparatus 44 is lowered into upstream manhole U and the flattened end of starter sleeve 58 is inserted into the upstream end of liner 33 so that the liner overlaps starter sleeve 58 by at least about 3 to 6 inches. Care is taken to maintain starter sleeve 58 flat to avoid introduction of air into liner 33. Alternatively, liner 33 can be simply secured about bladder 38 by banding or the like.

Inflation bladder 38 is formed of a tube of thermoplastic film, such as a polyolefin or polyvinyl chloride. A wide variety of thermoplastic materials would be suitable, such as polypropylene or polyurethane so long as the material will withstand the temperatures reached during cure.

Horizontal section 49 of elbow 46 is formed with an air/stream inlet port 61 for receiving air for eversion of bladder 38 and steam for cure. In the illustrated embodiment, elbow 46 also includes a condensate drain 62 for removing any condensate that forms in bladder 38 during cure and cool down. After inflation bladder 38 and starter sleeve 58 are installed, eversion assembly 44 is positioned in upstream manhole U as shown in FIG. 6.

Figure 7:
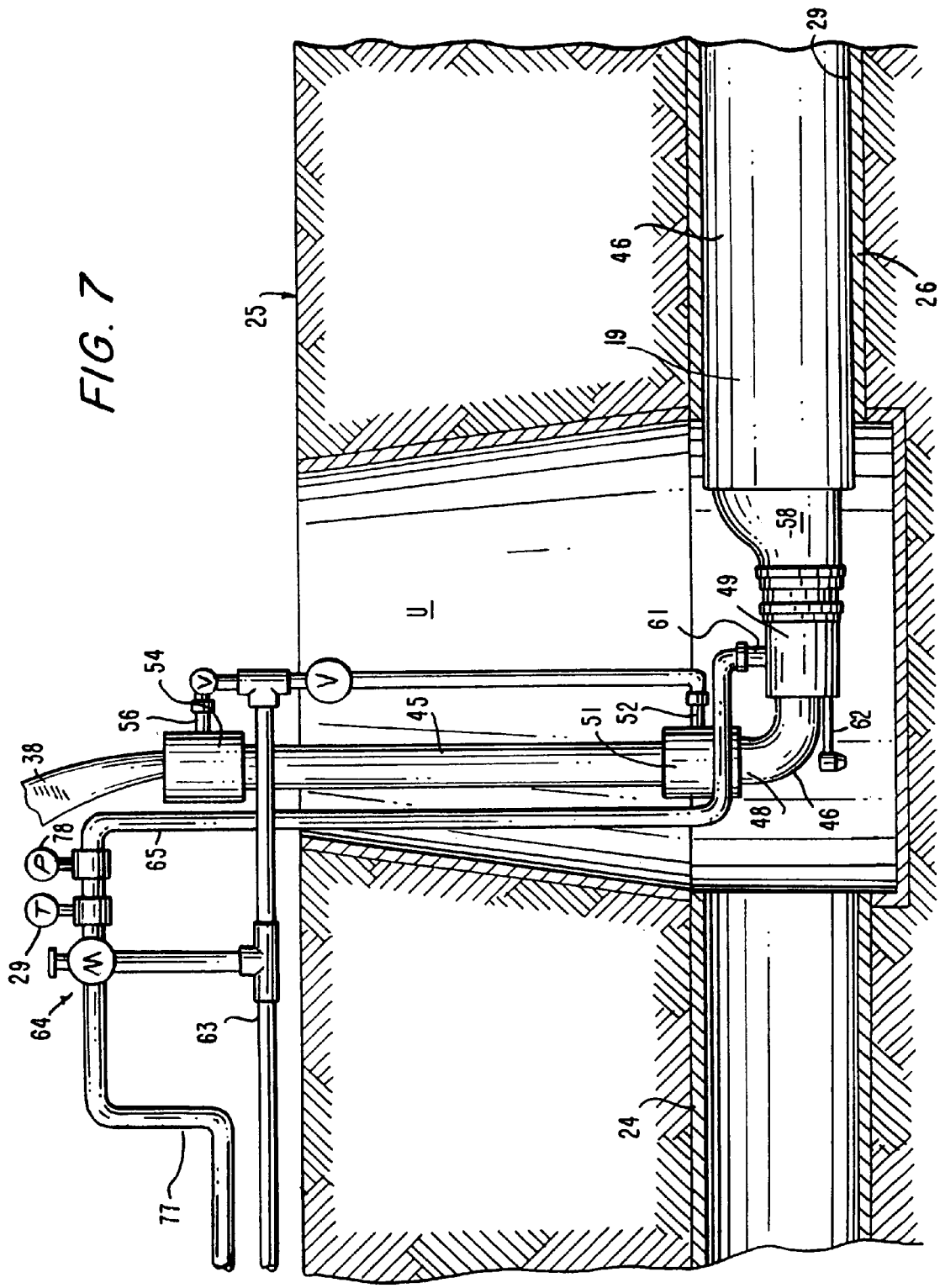
FIG. 7 is a detailed sketch of the air and steam piping connected to the eversion elbow in the eversion manhole during an installation.

At this time, inflation of liner 33 is ready to begin. At the start, air at about 5 psi is introduced into bladder canister 37 through air inlet 93. Once air pressure has stabilized, inflation bladder 38 is permitted to proceed through downtube 45 while maintaining an eversion pressure of about 5 psi. In the preferred embodiment, air is introduced from an air inlet source line 63, fed to canister inlet line 93 an air inlet 93 through a valve 99 and an air pressure regulator 101 as shown in FIG. 7. Air is then directed to air inlet line 65 for coupling to valve inlet 52. As inflation bladder 38 passes through starter sleeve 58 and enters liner 33, starter sleeve 58 will be locked in against the inlet of pipeline section 26 thereby locking eversion apparatus 44 and elbow 46 in place in upstream manhole U. Inflation bladder 38 continues to evert through liner 33 until it is brought to a few feet from downstream manhole D.

Figure 9:
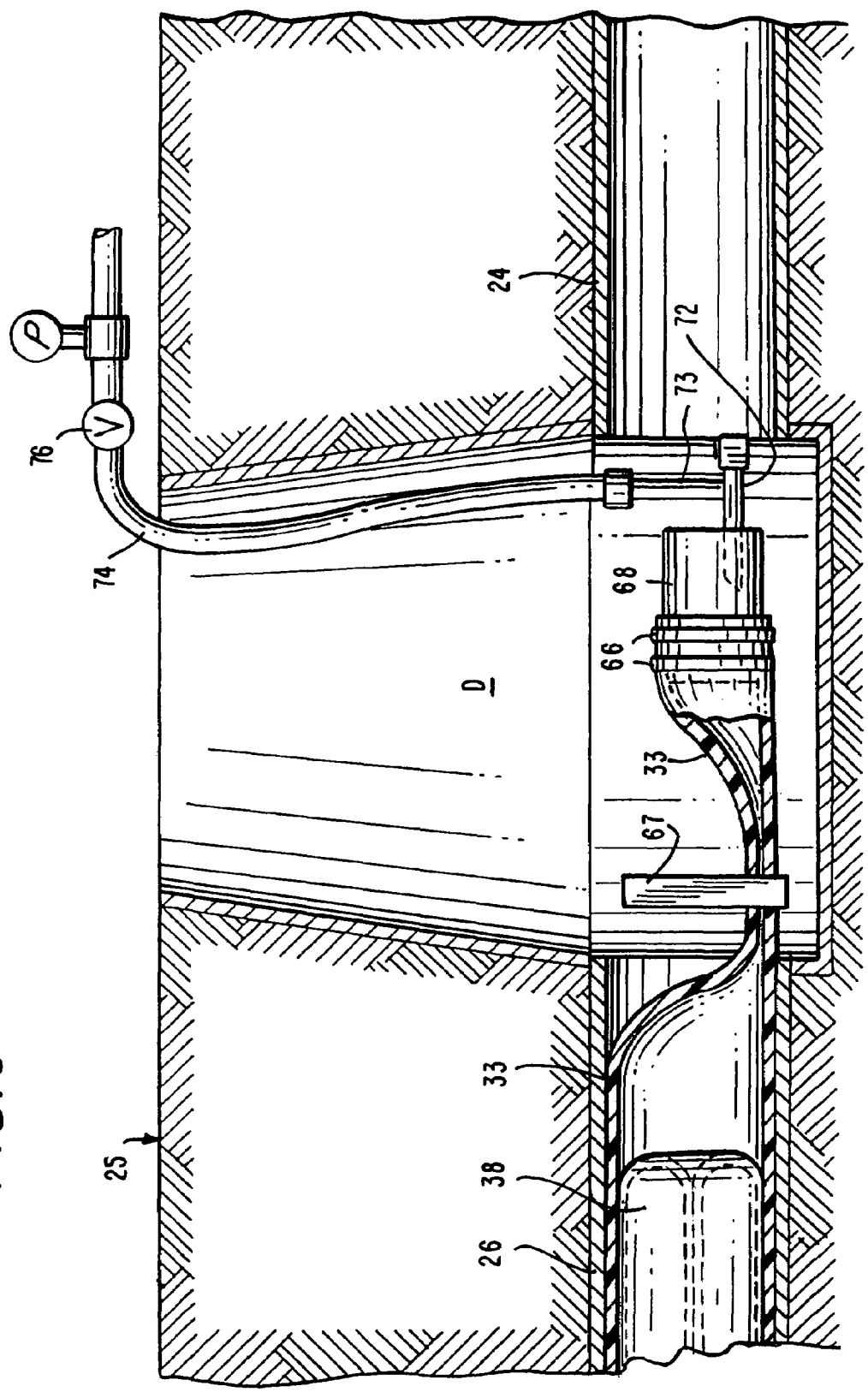
FIG. 9 and FIG. 10 are cross-sectional elevation view of receiving canisters positioned in the receiving manhole before completion of eversion of the bladder.

Referring to FIG. 9, eversion of inflation bladder 38 is stopped at about 5 to 10 feet from downstream manhole D. The 5 psi air pressure applied to bladder canister 37 is maintained when the eversion is stopped. The remaining excess of liner 33 in downstream manhole D is cut to about one foot from the back face of downstream manhole D. A sample mold 67 and two screw-type bands 66 are placed over the end of liner 33. The distal end of liner 33 is then banded about a cylindrical receiving canister 68 positioned at the back of downstream manhole D. Liner 33 is then secured to canister 68 with bands 66.

Canister 68 is a cyclindrical section of rigid material having a closed backwall 69. A bladder punch 71 is mounted to backwall 69. Bladder punch 71 is a sharp tapered tubular member coupled to a condensate drain 72 through backwall 69. An exhaust coupling 73 is fitted to condensate a drain 72 and an exhaust hose 74 is coupled thereto. The free end of exhaust hose 74 is positioned outside of downstream manhole D and securely positioned so that any steam-air discharge will not cause a safety hazard. At this time, thermocouples and pressure gauges at the steam-air discharge to read temperature and stream-air flow may be installed.

Receiving canister 68 is positioned securely within downstream manhole D using sandbags and braces, or other convenient implements. At this time, eversion of bladder 38 is resumed at the 5 psi air pressure. Inflation bladder 38 is everted until the nose of bladder 38 reaches backwall 69 of receiving canister 68. When bladder punch 71 punctures the everting face of bladder 38 air is allowed to exhaust through exhaust hose 74. Pressure in inflation bladder 38 can be controlled by an exhaust value 76 on exhaust hose 74.

Figure 8:
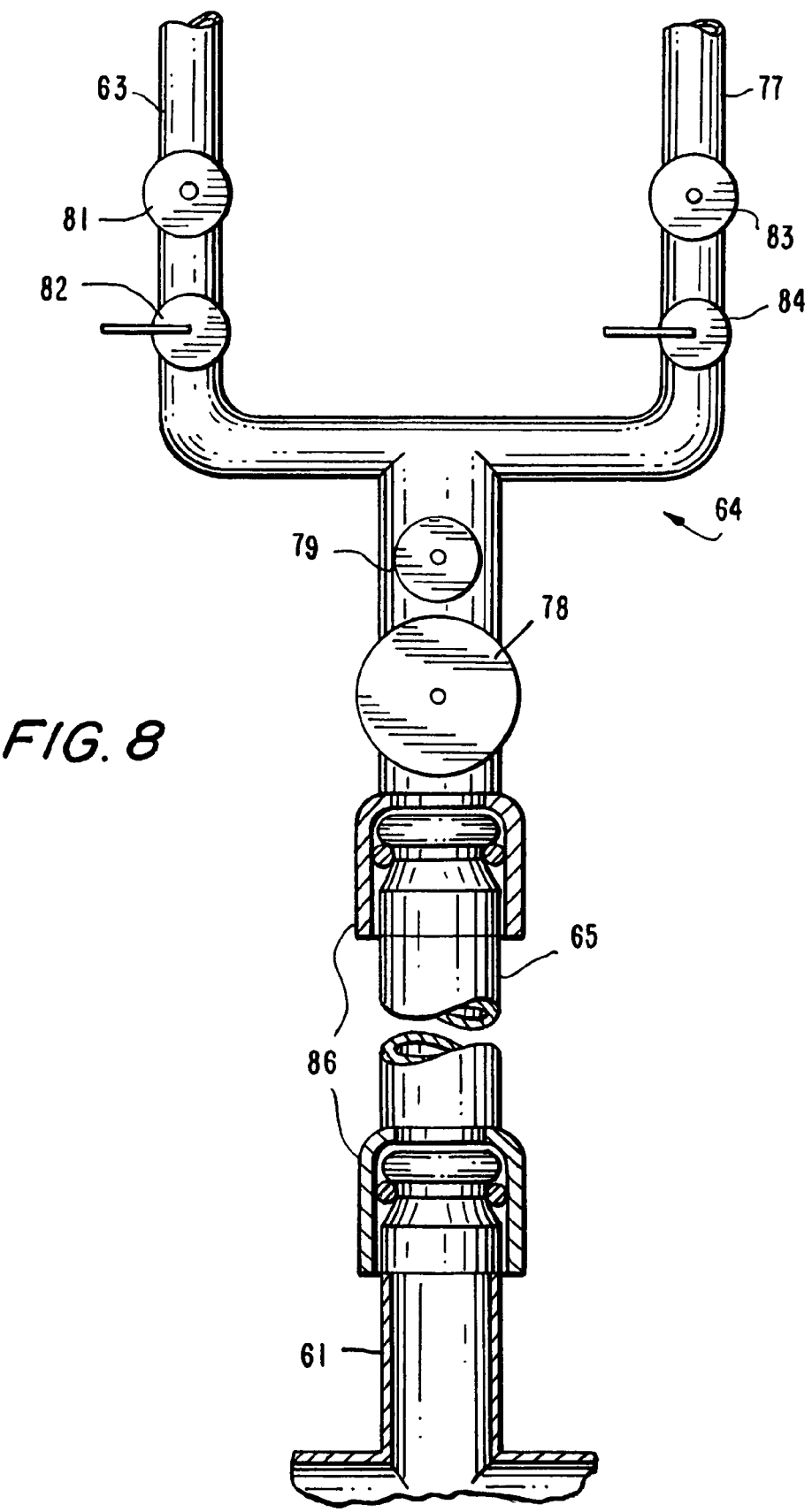
FIG. 8 is a detailed schematic view of the manifold for controlling air and steam temperature and volume in the process.

The details of a valve manifold 64 and the piping attached to steam line 65 is shown in FIG. 8. Air enters from air hose 63 through an air pressure regulator 81 and is controlled by an air valve 82. Steam entering from steam hose 77 is regulated by a steam pressure regulator 83 and controlled by a steam valve 84. Air and steam are mixed in air/steam hose 65 after passing through air/steam temperature gauge 79 and air/steam pressure gauge 78. Air/steam inlet hose 65 is coupled to manifold 64 and air/steam inlet in elbow 46 by a pair of cam lock, or Chicago fittings 86 or any other convenient hose coupling.

At this time air pressure sufficient to create a bulkhead between bladder canister and steam inlet 37, for example between about 25 to 60 psi, is applied to pinch valve 51. Steam is then introduced into air/stream inlet port 61 to initiate cure of the resin in liner 33. Steam is provided from a steam inlet hose 77 which is regulated by valve manifold 64 to provide steam to eversion elbow 46 for curing and an air/steam mixture to air/steam inlet line 65 for controlling temperature. The air/steam flow is adjusted to maintain a curing pressure of about 4 to 10 psi until the combined air/steam flow temperatures reach a desired temperature of about 220° F. measured at exhaust hose 74. Depending upon the particular resin and tube thickness, once the cure is complete, steam flow is turned off while simultaneously adjusting the air flow to maintain cure pressured. Exhaust valve 76 is adjusted while cooling to about 150° F.

Once the temperature has cooled to the desired level, air flow pressure is reduced to zero, exhaust valve 76 is fully opened and inflation bladder 38 is slowly de-everted. As bladder 38 de-everts, it will seal off the punctured end. Accordingly, it is desirable to monitor the air flow pressure to prevent pressure build up in bladder canister 37. Any condensate that may have accumulated in bladder 38 is removed by condensate drain 62 in elbow 46.

Figure 10:
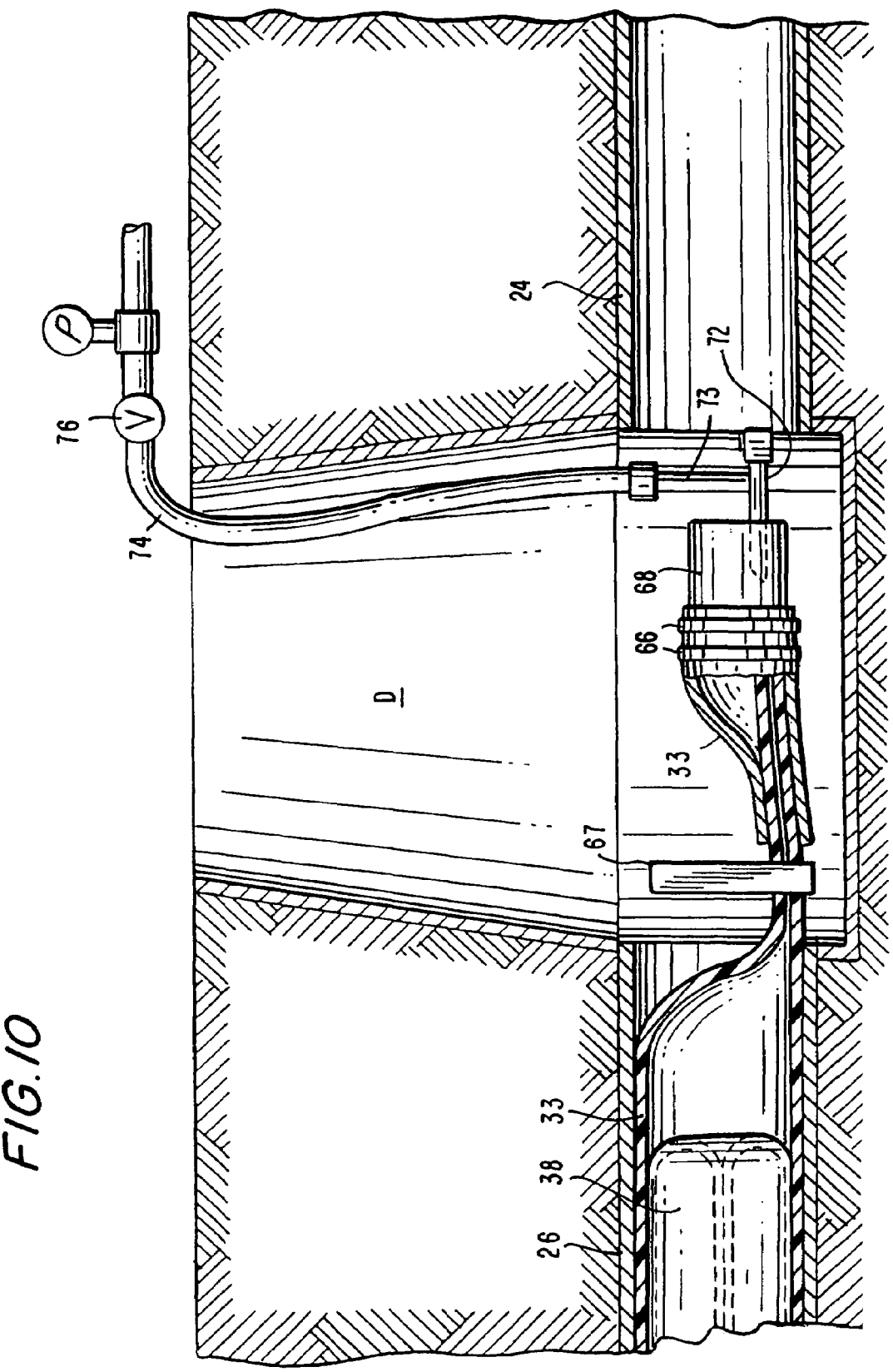

As shown in FIG. 10, a flexible receiving sleeve 87 is secured to canister 68 by a pair of bands 66. Receiving sleeve 87 is of the same robust flexible material as starter sleeve 58 and operates in the same manner to seal expanding liner 33 positioned therein between everting bladder 38 and the insider of receiving sleeve 87. As bladder 38 approaches backwall 69 and is punctured, pressure is maintained within bladder 38 in the same manner as described in connection with FIG. 9.

After bladder 38 has been totally de-everted, it is safe to enter downstream manhole D and remove sample mold 67 and receiving canister 68. Downtube 45 and elbow 48 are removed from upstream manhole U and any cured liner extending into either manhole is trimmed. At this time, liner 33 is now ready for any lateral reinstatement.

It can readily be seen that the process in accordance with the invention readily allows one to attain the advantage of accurately controlling the speed of an everting inflation bladder by use of a pressure bladder canister and isolating the everted bladder to curing a resin liner with flow through steam. By practicing the process, a tubular member can be easily everted through an existing pipeline. By closing a valve at the elbow inlet, pressure can be maintained within the everted tubular member and steam can be introduced at the elbow access and flow through the curing liner to utilize the higher energy available in the steam to cure the resin significantly faster than one can cure utilizing circulating hot water.

It will thus be seen that the objects set fort above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. A method for trenchless rehabilitation of an existing pipeline with a flexible resin impregnated liner, comprising:
   introducing a flexible resin impregnated liner into an existing pipeline from a first access point to a second access point;
   installing an inlet canister into the liner at the first access point;
   installing an exhaust canister at the opposite end of the liner at the second access point, the exhaust canister including an exhaust coupling;
   introducing air into the liner from the inlet canister to inflate the liner against the interior wall of the existing pipeline;

injecting steam into the inlet canister and adjusting the air/steam mixture through the liner and exit through the exhaust canister;

allowing the resin to cure;

cease introducing steam;

introducing air to cool the cured liner; and allowing the cured liner to cool.

2. The method of claim 1, comprising;

injecting an air/steam mixture into the inlet canister to heat the liner to about 220° F.

3. The method of claim 1, comprising:

installing the liner by pulling in the liner from one access point to the other access point.

4. The method of claim 1, comprising:

installing the liner by inverting the liner into the existing pipeline from one access point to the other access point.

5. The method of claim 4, wherein the liner is inverted through the inlet canister.

6. The method of claim 3, comprising; inflating the liner by inverting an inflation bladder into the pulled in liner.

7. The method of claim 1, including introducing air into the liner through an inlet port for introduction of fluid in the inlet canister to maintain pressure and;

introducing steam into the inlet canister to pass through the liner and the exhaust canister.

8. The method of claim 1, including introducing an air/steam mixture into the liner through an inlet port for introduction of fluid in the inlet canister.

9. The method of claim 4, comprising:

installing the liner into the existing pipeline by introducing the liner through a selectively actuatable valve capable of allowing a liner to pass therethrough and capable of forming a seal to isolate the interior of an evening liner.

10. The method of claim 1, including draining condensate through the exhaust canister.

11. The method of claim 3, including inverting a bladder through the inlet canister into the pulled in liner.

12. The method of claim 11, including;

stopping the inverting bladder before reaching the second access point;

installing the exhaust canister into the liner of the second access point; and continuing the inversion so that the bladder enters the exhaust canister.

13. The method of claim 1, including attaching an exhaust hose to the exhaust canister coupling.

14. The method of claim 13, including adjusting the flow of air and/or steam exiting through the exhaust hose.

* * * * *